(12) United States Patent
Fujita

(10) Patent No.: US 7,666,488 B2
(45) Date of Patent: Feb. 23, 2010

(54) HONEYCOMB STRUCTURE AND METHOD OF MANUFACTURING THE SAME

(75) Inventor: Jun Fujita, Nagoya (JP)

(73) Assignee: NGK Insulators, Ltd., Nagoya-shi (JP)

( * ) Notice: Subject to any disclaimer, the term of this patent is extended or adjusted under 35 U.S.C. 154(b) by 466 days.

(21) Appl. No.: 10/556,568

(22) PCT Filed: May 12, 2004

(86) PCT No.: PCT/JP2004/006715

§ 371 (c)(1),
(2), (4) Date: Nov. 21, 2006

(87) PCT Pub. No.: WO2004/099103

PCT Pub. Date: Nov. 18, 2004

(65) Prior Publication Data

US 2007/0092691 A1    Apr. 26, 2007

(30) Foreign Application Priority Data

May 12, 2003    (JP)    ............... 2003-133630

(51) Int. Cl.
*B32B 3/12* (2006.01)
*B29C 65/00* (2006.01)
*B28B 21/00* (2006.01)
(52) U.S. Cl. ............... 428/116; 156/60; 264/630
(58) Field of Classification Search ............... 428/116; 55/523, 585.3, 483, 502, 529; 156/60, 89.11, 156/89.22
See application file for complete search history.

(56) References Cited

U.S. PATENT DOCUMENTS 3,887,418 A * 6/1975 Jurisich ............... 156/197
2003/0053940 A1 * 3/2003 Harada et al. ............... 422/180

FOREIGN PATENT DOCUMENTS

| JP | A-2000-007455 | 1/2000 |
| JP | A-2000-279728 | 10/2000 |
| JP | A-2002-219317 | 8/2002 |

* cited by examiner

*Primary Examiner*—David R Sample
*Assistant Examiner*—Nicole T Gugliotta
(74) *Attorney, Agent, or Firm*—Oliff & Berridge, PLC

(57) ABSTRACT

A honeycomb structure includes a plurality of honeycomb segments each having a polygonal cross section with an adhesive agent interposed between each two honeycomb segments, the plurality of honeycomb segments each having a plurality of channels which are partitioned from one another by porous partition walls, the plurality of channels penetrating through the honeycomb segment in a uniaxial direction. The plurality of honeycomb segments are arrayed in a way that adhesive agent-applied surfaces and adhesive agent-unapplied surfaces respectively of the plurality of honeycomb segments are arranged alternately along bonded lines each joining bonded surfaces respectively of abutting honeycomb segments. In each of the honeycomb segments, an adhesive agent is applied to at least one side surface, and the honeycomb segments and at least one honeycomb segment, in each of which the adhesive agent is applied to no side surface.

13 Claims, 15 Drawing Sheets

FIG.5A  FIG.5B
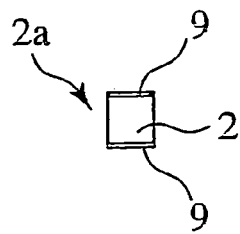
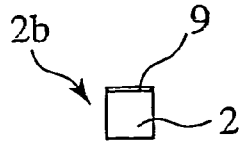
FIG.6
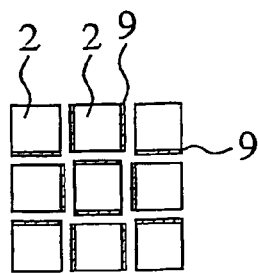
FIG.7A  FIG.7B
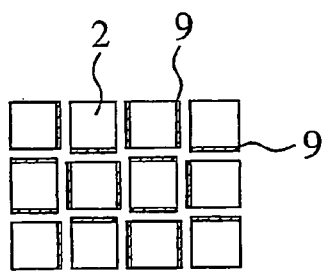
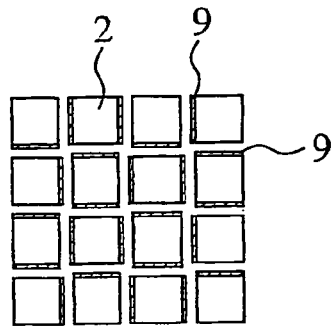
FIG.8A  FIG.8B  FIG.8C
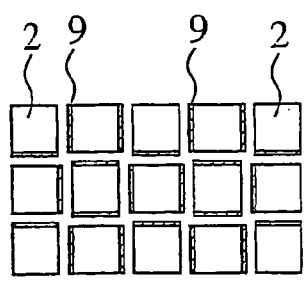
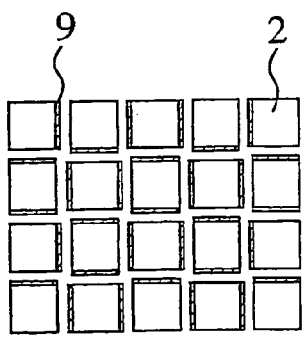
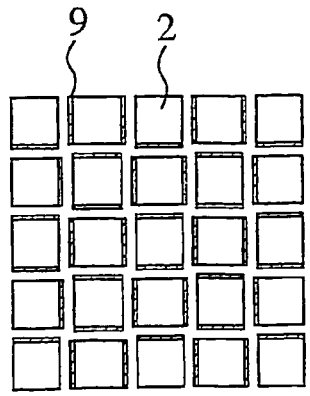

FIG.19A  FIG.19B  FIG.19C  FIG.19D
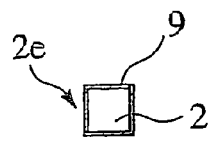 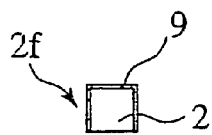 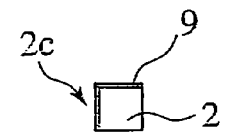 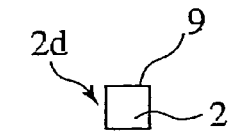
FIG.20
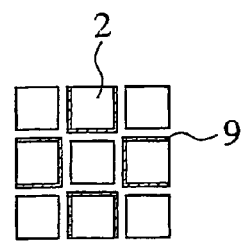
FIG.21A  FIG.21B
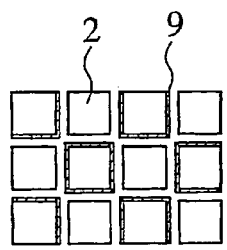 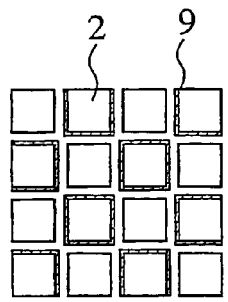
FIG.22A  FIG.22B  FIG.22C
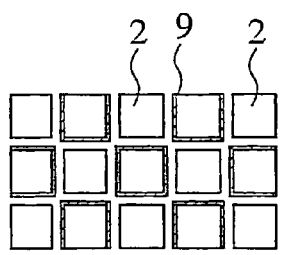 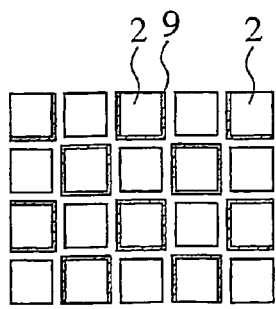 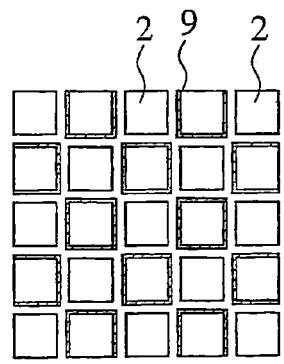

HONEYCOMB STRUCTURE AND METHOD OF MANUFACTURING THE SAME

TECHNICAL FIELD

The present invention relates to a honeycomb structure to be used in a diesel particulate filter (DPF) for capturing and removing, particulates included in exhaust gas emitted from a diesel engine and the like as well as other types of collection filters. In addition, the present invention relates to a method of manufacturing the honeycomb structure.

BACKGROUND ART

A honeycomb structure has a structure which is created through the following process. A plurality of porous honeycomb segments made of silicon carbide or the like are bonded with one another by use of bonding layers of an adhesive agent, and thus a honeycomb segment assembly is fabricated. Then, the honeycomb segment assembly is ground, and is worked out, into a shape with a desired outer form such as a rounded cross section. Subsequently, the periphery of the honeycomb segment assembly thus ground is coated with a coating material. This honeycomb structure is used for cleaning exhaust gas by depositing the honeycomb structure in an exhaust system of a diesel engine.

Each of the honeycomb segments includes a large number of channels, which are partitioned from one another by porous partition walls, and which penetrate through the honeycomb segment in a uniaxial direction. In addition, abutting channels are blocked at alternate ends. In other words, a channel is opened at an end, and is blocked at the other end. Another channel abutting on the channel is the other way round.

Once exhaust gas flows into a channel from an opened end of the channel, the structure causes the exhaust gas to pass through the porous partition walls, and to flow out of the abutting channels. While the exhaust gas is passing through the partition walls, particulates in the exhaust gas are captured by the partition walls. Thereby, the exhaust gas can be cleaned.

A conventional method of manufacturing such a honeycomb structure has been as follows. Honeycomb segments are fabricated in a way that the honeycomb segments are, for example, square cross-sectioned. The periphery (side surfaces) of each of the honeycomb segments thus fabricated is coated with an adhesive agent such as a ceramic slurry. Thereafter, the honeycomb segments are placed in arrays on a supporting jig. The honeycomb segments thus placed are pressed against one another in a way that the honeycomb segments are brought into full contact with one another. Subsequently, the honeycomb segments are ground, and are worked out, into a predetermined shape. (Japanese Patent Laid-open Official Gazette No. 2000-7455)

However, in a honeycomb structure manufactured by use of the conventional manufacturing method, cracks may occur in some cases.

DISCLOSURE OF THE INVENTION

By analyzing a conventional honeycomb structure in which cracks have occurred, the present inventor has made a finding that conditions under which each of honeycomb segments and an adhesive agent are arrayed when the honeycomb segments are going to be bonded with one another are a cause of the cracks, as described below.

FIG. 1 shows a pattern in which each of honeycomb segments 100 and an adhesive agent 110 are arrayed in accordance with the conventional method of bonding honeycomb segments with one another. This pattern is equivalent to a pattern in which each of the honeycomb segments and the adhesive agent are arrayed in the direction which cross-sections the honeycomb structure, or a pattern in which each of the honeycomb segments and the adhesive agent are arrayed in a cross-section perpendicular to the direction in which exhaust gas flows.

In the case of the conventional manufacturing method, the honeycomb segments 100 are formed in a way that the honeycomb segments have the respective square cross sections of a single size. The periphery (side surfaces) of each of the honeycomb segments 100 is coated with the adhesive agent 110 of a ceramic slurry or the like in order to bond the honeycomb segment with its abutting honeycomb segments. A plurality of honeycomb segments 100 each coated with the adhesive agent 110 are bonded with one another while placed in arrays. Thereby, a honeycomb segment assembly is fabricated. In this case, the direction in which the honeycomb segments are placed in arrays is determined, and the honeycomb segments are bonded with one another in the direction thus determined, lest the adhesive agent 110 should be double-applied to an interstice between each two abutting honeycomb segments.

When the honeycomb segments are going to be bonded with one another, in some cases, a surface with the adhesive agent 110 continuously applied thereto and a surface with no adhesive agent 110 continuously applied thereto are bonded face to face with each other while the two surfaces interpose a bonded line 120 joining bonded surfaces respectively of abutting honeycomb segments 100.

The present inventor has made the following findings. In the case of the conventional honeycomb structure, cracks are more likely to occur in honeycomb segments 100 in the surface with no adhesive agent 110 continuously applied thereto. Cracks which have occurred there develop in the surface with no adhesive agent 110 continuously applied thereto, and resultantly lead to cracks spreading in the entire honeycomb structure.

One may consider that, in the surface with the adhesive agent 110 continuously applied thereto, moisture to be contained in the adhesive agent 110 spreads and moves over the honeycomb segments 100. This strengthens the honeycomb segments 100. By contrast, in the surface with no adhesive agent 110 continuously applied thereto, a smaller amount of moisture moves out of the adhesive agent 110. This makes the surface with no adhesive agent 110 continuously applied thereto less strong. As a result, cracks are more likely to occur in the honeycomb segments 100 in the surface with no adhesive agent 110 continuously applied thereto. Cracks which have occurred there develop in the surface with no adhesive agent 110 continuously applied thereto, and resultantly lead to cracks spreading in the entire honeycomb structure.

The present invention has been made on the basis of the findings which the present inventor has made. An object of the present invention is to provide a honeycomb structure which makes it possible to curb occurrence of cracks, and which is obtained by bonding a plurality of honeycomb segments with one another by use of an adhesive agent. The object of the present invention includes providing a method of manufacturing the honeycomb structure.

A honeycomb structure according to a first aspect of the present invention includes a honeycomb segment assembly to be obtained by bonding a plurality of honeycomb segments each having a polygonal cross section with the adhesive agent interposed between each two abutting honeycomb segments, each of the plurality of honeycomb segments having a plurality of channels which are partitioned by porous partition walls, and which channels penetrate through the honeycomb segment in a uniaxial direction. (A) In this honeycomb segment assembly, a plurality of honeycomb segments each with the adhesive agent applied to at least one side surface thereof are arrayed side by side along a bonded line joining bonded surfaces respectively of abutting honeycomb segments, in a way that adhesive agent-applied side surfaces and adhesive agent-unapplied side surfaces respectively of the honeycomb segments are arrayed alternately. (B) Otherwise, in this honeycomb segment assembly, a plurality of honeycomb segments each with the adhesive agent applied to at least one side surface thereof and at least one honeycomb segment with the adhesive agent applied to no side surface thereto are arrayed side by side along the bonded line joining the bonded surfaces respectively of neighboring honeycomb segments, in a way that adhesive agent-applied side surfaces and adhesive agent-unapplied side surfaces respectively of the honeycomb segments are arrayed alternately.

In addition, a method of manufacturing a honeycomb structure according to a second aspect of the present invention includes the fabricating step, the arraying step and the arraying-and-bonding step. The fabricating step is for fabricating a honeycomb segment with a plurality of channels which are partitioned by porous partition walls, and which penetrate through the honeycomb segment in a uniaxial direction, the honeycomb segment having a polygonal cross-section. The applying step is for applying an adhesive agent to at least one side surface of the honeycomb segment. The arraying-and-bonding step is for: arraying (A) a plurality of honeycomb segments each with the adhesive agent applied to at least one side surface thereof, or (B) the plurality of honeycomb segments each with the adhesive agent applied to at least one side surface thereof and at least one honeycomb segment with the adhesive agent applied to no side surface thereof, side by side along a bonded line joining bonded surfaces respectively of neighboring honeycomb segments, in a way that adhesive agent-applied side surfaces and adhesive agent-unapplied side surfaces respectively of the honeycomb segments are arrayed alternately; and bonding the plurality of honeycomb segments thus arrayed with one another.

BRIEF DESCRIPTION OF DRAWINGS

FIGS. 5A and 5B are cross-sectional views respectively of honeycomb segments 2a and 2b which are used for honeycomb structures shown in FIGS. 6 to 11F, the adhesive agent being applied to at least one side surfaces of the honeycomb segments 2a and 2b respectively.

FIGS. 6 to 8C respectively show examples of patterns in which the honeycomb segments 2a shown in FIG. 5A and the honeycomb segments 2b shown in FIG. 5B are arranged in 3 rows×3 columns, 3 rows×4 columns, 4 rows×4 columns, 3 rows×5 columns, 4 rows×5 columns and 5 rows×5 columns in the direction which cross-sections the honeycomb structure.

FIGS. 19A, 19B, 19C and 19D are cross-sectional views respectively of honeycomb segments 2e, 2f, 2c and 2d which are used for honeycomb structures shown in FIGS. 20 to 25F, the adhesive agent being applied to at least one side surfaces of the honeycomb segment 2e, 2f and 2c, the adhesive agent being applied to no side surface of the honeycomb segments 2d.

FIGS. 20 to 22C respectively show patterns in which the honeycomb segments 2e shown in FIG. 19A, the honeycomb segments 2f shown in FIG. 19B, the honeycomb segments 2c shown in FIG. 19C and the honeycomb segments 2d shown in FIG. 19D are arranged in 3 rows×3 columns, 3 rows×4 columns, 4 rows×4 columns, 3 rows×5 columns, 4 rows×5 columns and 5 rows×5 columns in the direction which cross-sections the honeycomb structure.

BEST MODE FOR CARRYING OUT THE INVENTION

Figure 1:
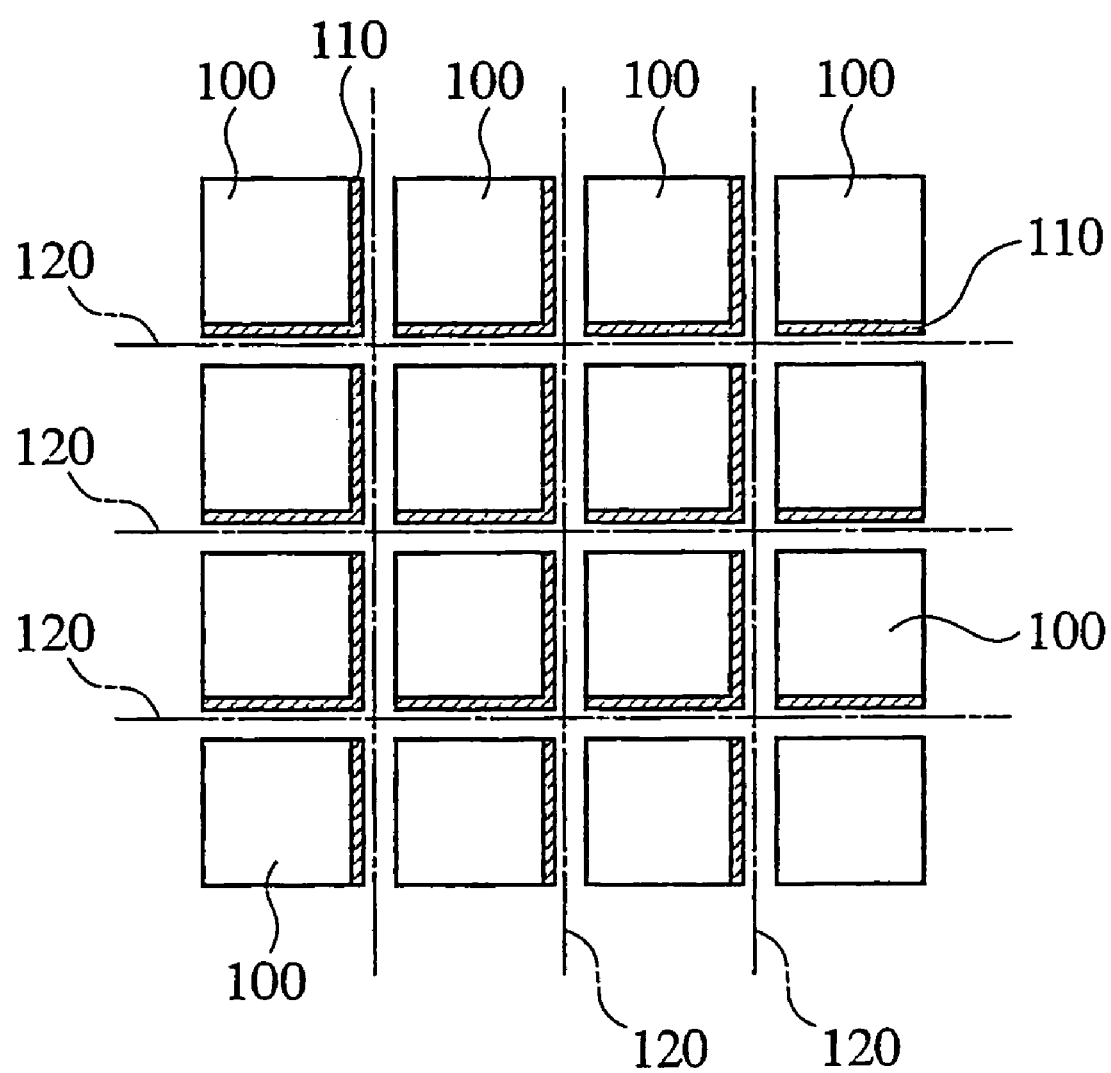
FIG. 1 shows a pattern in which each of honeycomb segments 100 and an adhesive agent 110 are arranged in the direction cross-sectioning a conventional honeycomb structure in a step of bonding the honeycomb segments 100 into the honeycomb structure.

A honeycomb structure according to an embodiment of the present invention is characterized by including a honeycomb segment assembly to be obtained by bonding a plurality of honeycomb segments with an adhesive agent interposed between each two neighboring honeycomb segments. Each of the plurality of honeycomb segments has a large number of channels, which are partitioned from one another by porous partition walls, and which penetrate the honeycomb segment in a uniaxial direction. The honeycomb structure is characterized in that, in the honeycomb segment assembly, adhesive agent-applied surfaces and adhesive agent-unapplied surfaces respectively of the honeycomb segments are arrayed alternately along the bonded line joining bonded surfaces respectively of abutting honeycomb segments in a way that the adhesive agent-applied surfaces are not arrayed side by side, and in a way that the adhesive agent-unapplied surfaces are not arrayed side by side.

In addition, a method of manufacturing the honeycomb structure is characterized in that a honeycomb segment assembly is obtained in the following manner. First, the plurality of honeycomb segments are alternately arrayed along the bonded line joining the bonded surfaces respectively of the abutting honeycomb segments in a way that the adhesive agent-applied surfaces are not arrayed side by side, and in a way that the adhesive agent-unapplied surfaces are not arrayed side by side. Then, the plurality of honeycomb segments thus arrayed are fitted to one another. The plurality of honeycomb segments are pressed against one another while the plurality of honeycomb segments are being fitted to one another. Thereby, a tentative honeycomb segment assembly is fabricated. Thereafter, the tentative honeycomb segment assembly is heated, and thereby the adhesive agent is solidified. Thus, the plurality of honeycomb segments are bonded with one another. In this manner, the honeycomb segment assembly is obtained.

In the case of the honeycomb structure and the method of manufacturing the honeycomb structure according to this embodiment, neither a surface with the adhesive agent continuously applied thereto nor a surface with no adhesive agent continuously applied thereto occurs on the two sides of the bonded line joining the bonded surfaces respectively of the abutting honeycomb segments. This is because the adhesive agent-applied surfaces of honeycomb segments and the adhesive agent-unapplied surfaces of the other honeycomb segments are alternately arrayed along the bonded line. Accordingly, moisture moving from the adhesive agent on one side of the bonded line is equal to moisture moving from the adhesive agent on the other side of the bonded line. This makes the strength on one side of the bonded line equal to the strength on the other side of the bonded line. This can prevent a crack from occurring. This makes it possible to satisfactorily inhibit a crack from developing into the honeycomb structure which is obtained by bonding the honeycomb segments.

Hereinafter, concrete descriptions will be provided for the honeycomb structure according to this embodiment of the present invention with reference to the drawings.

Figure 2:
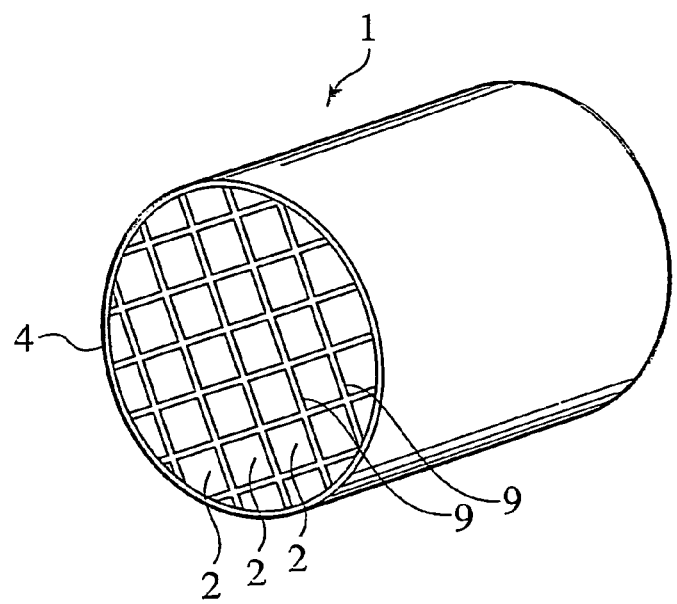
FIG. 2 is a perspective view of a honeycomb structure 1 according to an embodiment of the present invention.

First of all, FIG. 2 shows an example of an appearance of a honeycomb structure 1 according to this embodiment of the present invention. As shown in FIG. 2, the honeycomb structure 1 is obtained in the following manner. A plurality of honeycomb segments 2 are bonded with one another by use of bonding layers of an adhesive agent 9, and thus a honeycomb segment assembly is fabricated. The honeycomb segment assembly thus fabricated is ground, and is worked out, in a way that the honeycomb segment assembly has a rounded, elliptic, triangular, or another cross section. Then, the periphery of the honeycomb segment assembly is coated with a coating material layer 4.

Figure 3A:
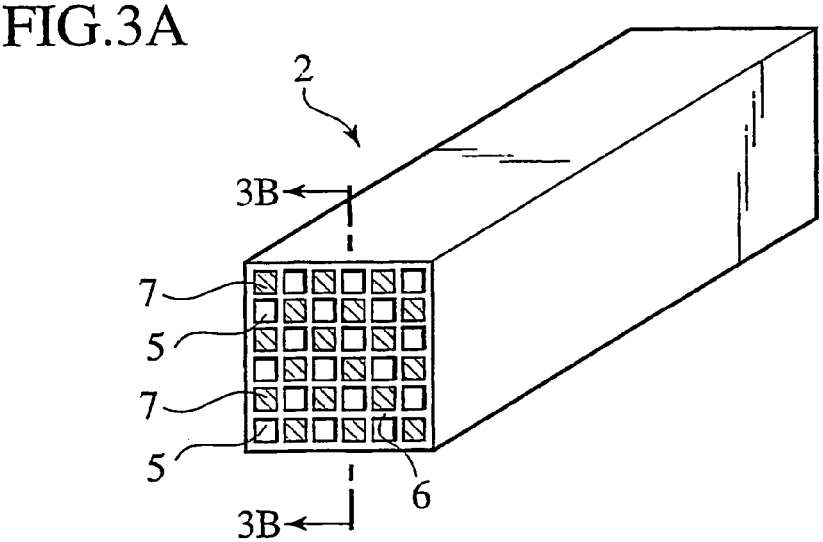
FIG. 3A is a perspective view of honeycomb segments 2 according to the embodiment of the present invention.
Figure 3B:
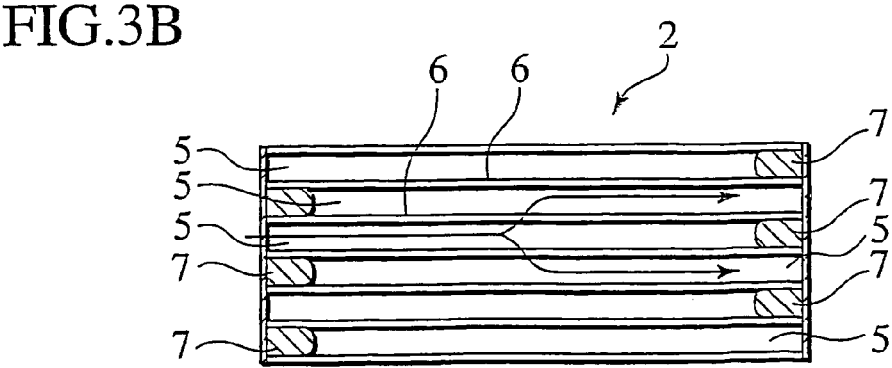
FIG. 3B is a cross-sectional view of the honeycomb segments 2.

Each honeycomb segment 2 has a large number of channels 5 which are partitioned from one another by porous partition walls 6, as shown in FIGS. 3A and 3B. Each of the channels 5 penetrates through the honeycomb segment 2 in a uniaxial direction. Abutting channels 5 are blocked at alternate ends by use of a filler 7. In other words, a channel 5 is opened at the left end, and is blocked at the right end by use of the filler 7. Another channel 5 abutting on this channel is blocked at the left end by use of the filler 7, and is opened at the right end.

If the honeycomb structure 1 is fabricated with such a structure, in a case where the honeycomb structure 1 is used as a DFD, exhaust gas flows into a channel which is opened at the left end, and passes through the porous partition walls 6 into the abutting channels, thereafter flowing out of the abutting channels, as shown by arrows in FIG. 3B. While the exhaust gas is passing through the partition walls 6, particulates in the exhaust gas are captured by the partition walls 6. Thus, the exhaust gas can be cleaned.

The honeycomb segment 2 shown in FIG. 3A has a square cross section. However, the honeycomb segment 2 can have a polygonal cross section, such as a triangular or hexagonal cross section, depending on the necessity. In addition, the cross section of each of the channels 5 can be triangular, hexagonal, circular, elliptic, or other.

From a viewpoint of strength and heat resistance of the honeycomb segments 2, it is advantageous that a material of the honeycomb segments 2 be a material to be obtained by combining at least one selected from a group consisting of cordierite, mullite, alumina, spinel, silicon carbide, silicon carbide-cordierite containing composite, silicon-silicon carbide composite, silicon nitride, lithium aluminum silicate, aluminum titanate, Fe—Cr—Al containing metal. Incidentally, from a viewpoint of a coefficient of heat conductivity of the honeycomb segments 2, it is advantageous that a material of the honeycomb segments 2 be silicon carbide or silicon-silicon carbide composite.

The honeycomb segments 2 can be fabricated in the following manner. A binder, a surfactant, water and the like are added to a material selected from the aforementioned group, and thus a plastic ceramic body material is obtained. The binder is methyl cellulose, hydroxypropoxyl cellulose, hydroxyethyl cellulose, carboxymethyl cellulose, polyvinyl alcohol, or the like. This ceramic body material is extruded into a honeycomb having a large number of channels 5, which are partitioned from one another by the partitions walls 6, and which penetrate through the honeycomb in a uniaxial direction. The honeycomb thus fabricated is dried by use of microwaves, heated air or the like. Thereafter, the honeycomb thus dried is sintered. Thus, the honeycomb segment 2 is fabricated.

In the case where the honeycomb segment 2 thus fabricated is used as a DPF, it is advantageous that the channels 5 be blocked at their respective openings by use of the filler 7. It is more advantageous that the channels 5 be blocked at alternate ends, thus looking like checkers. The channels can be blocked by use of the filler 7 in the following manner. The end surfaces of the honeycomb segment 2 are covered with a resin film. A laser beam is irradiated onto the ends of channels 5 which are intended to be blocked while leaving channels 5, which are intended not to be blocked, as they are. Thus, the channels 5 which are intended to be blocked are opened at their ends. The filler in the form of slurry is injected into the channels 5 which are opened at their ends. After this injection, the honeycomb segment is dried and baked. Thus, the channels are blocked by use of the filler 7. A material similar to that used as the honeycomb segment 2 can be used as the filler 7.

What is agreeable to the material of the honeycomb segment 2 is used as a material of the adhesive agent 9, by use of which the honeycomb segments 2 are bonded with one another. For this reason, a material whose chief component is ceramics is suitable as the adhesive agent 9. A material which is obtained by adding a metal in the form of metal fibers or the like, a pore-forming material, various ceramics particles and the like, depending on the necessity, to a mixture of inorganic particles or fibers of silicon carbide, silicon nitride, cordierite, aluminum, mullite or the like with a colloidal sol of colloidal silica, colloidal alumina or the like can be selected.

It is advantageous that a coefficient of thermal conductivity of the adhesive agent 9 be 0.1 W/m·K to 5 W/m·K. It is more advantageous that the coefficient of thermal conductivity of the adhesive agent 9 be 0.2 W/m·K to 3 W/m·K. In a case where the coefficient of thermal conductivity of the adhesive agent 9 is smaller than 0.1 W/m·K, heat conduction among the honeycomb segments 2 is hindered, and accordingly the temperature inside the honeycomb structure is uneven. For this reason, the coefficient of thermal conductivity which is smaller than 0.1 W/m·K is disadvantageous. On the other hand, in a case where the coefficient of thermal conductivity exceeds 5 W/m·K, the bonding strength is decreased. In addition, this makes it difficult to manufacture the honeycomb structure.

It is advantageous that a coefficient of thermal expansion of the adhesive agent 9 be relatively small from a viewpoint of necessity of preventing a crack from occurring due to a thermal shock. For this reason, it is advantageous that the coefficient of thermal expansion of the adhesive agent 9 be in a range of $1 \times 10^{-6}/°$ C. to $8 \times 10^{-6}/°$ C. It is more advantageous that the coefficient of thermal expansion of the adhesive agent 9 be in a range of $1.5 \times 10^{-6}/°$ C. to $7 \times 10^{-6}/°$ C. It is the most advantageous that the coefficient of thermal expansion of the adhesive agent 9 be in a range of $2 \times 10^{-6}/°$ C. to $6 \times 10^{-6}/°$ C.

The honeycomb structure 1 is manufactured in the following manner. A plurality of honeycomb segments 2 are placed in arrays, and are fitted to one another. The adhesive agent 9 is applied to the plurality of honeycomb segments 2 in accordance with below-mentioned pattern conditions with which the honeycomb segments are arrayed. In other words, the adhesive agent 9 is applied to a side surface (side surfaces) of each of the plurality of honeycomb segments 2. The plurality of honeycomb segments 2 thus fitted are pressed against one another, and thus are assembled. Thereby, a tentative honeycomb segment assembly is formed. No specific restriction is imposed on a force with which the honeycomb segments are pressed against one another. It is advantageous that the honeycomb segments be pressed against one another with a pressing force of approximately 0.3 kgf/cm² to 3 kgf/cm². It is more advantageous that the honeycomb segments be pressed against one another with a pressing force of approximately 0.5 kgf/cm² to 2 kgf/cm². By means of the pressing, abutting honeycomb segments 2 are bonded with one another with the adhesive agent 9 interposed between each two abutting honeycomb segments.

Subsequently, the tentative honeycomb segment assembly is heated in a drying chamber. Thereby, the adhesive agent 9 is dried and solidified. The tentative honeycomb segment assembly can be heated at a temperature of 50° C. to 150° C. Through the drying and solidification of the adhesive agent 9, the honeycomb segment assembly in which the honeycomb segments are firmly bonded with one another is fabricated. This honeycomb segment assembly thus fabricated is ground, and is worked out, in a way that the honeycomb segment assembly has a circular, elliptic, triangular, or another cross section. Then, the periphery of the honeycomb segment assembly is coated with the coating material layer 4. Thus, the honeycomb structure 1 is manufactured.

Figure 4:
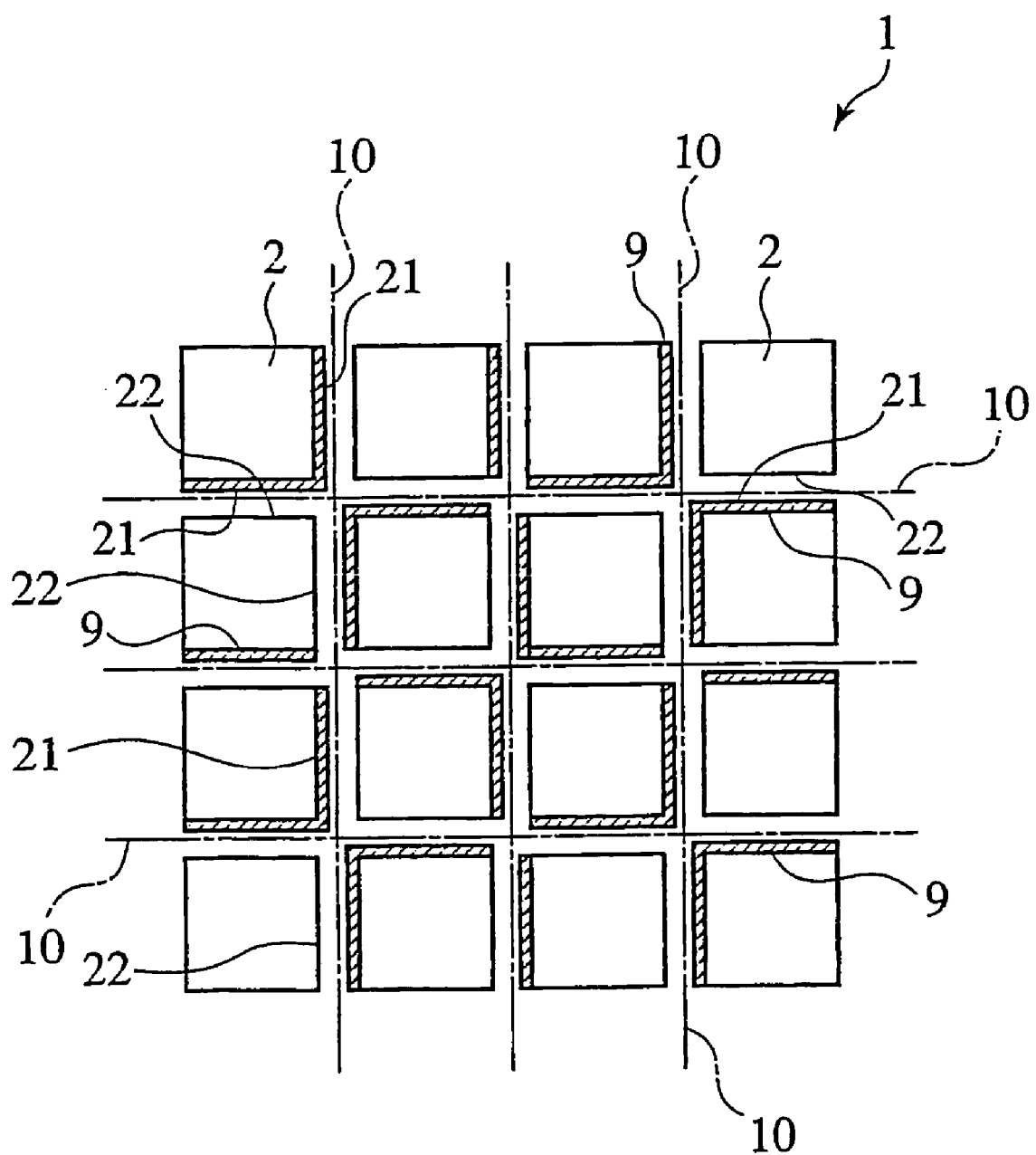
FIG. 4 shows a pattern in which each of honeycomb segments 2 and an adhesive agent 9 are arrayed in the direction cross-sectioning the honeycomb structure 1 according to the embodiment of the present invention in a step of bonding the honeycomb segments 2 into the honeycomb structure 1.

FIG. 4 shows an embodiment as an example of bonding the honeycomb segments 2. It should be noted that an illustration of the channels inside each of the honeycomb segments 2 is omitted for convenient purposes in FIG. 4.

The plurality of honeycomb segments 2 are molded so that the honeycomb segments have the respective square cross sections which are of the same size. Each of the honeycomb segments 2 is bonded with the abutting honeycomb segments with the adhesive agent 9 interposed between the honeycomb segment and any of the abutting honeycomb segments. The adhesive agent 9 is applied to an external surface(s) (a side surface(s)) of each of the honeycomb segments 2. A surface of each of the honeycomb segments 2 to which the adhesive agent 9 is applied is defined as an adhesive agent-applied surface 21, and a surface of each of the honeycomb segments to which no adhesive agent 9 is applied is defined as an adhesive agent-unapplied surface 22.

In FIG. 4, reference numeral 10 denotes the bonded line joining the bonded surfaces respectively of the honeycomb segments 2. In the case of this embodiment, adhesive agent-applied surfaces 21 and adhesive agent-unapplied surfaces 22 are arrayed alternately along the bonded line 10.

For example, in a cluster of honeycomb segments 2 in the uppermost row (the first row) which are arrayed side by side over the uppermost bonded line 10 in the horizontal direction in FIG. 4, the bonded surfaces respectively of the honeycomb segments 2, which bonded surfaces face the bonded line 10, are arranged in alternations of the adhesive agent-applied surface 21, the adhesive agent-unapplied surface 22, the adhesive agent-applied surface 21 and the adhesive agent-unapplied surface 22 in order from left to right. In a cluster of honeycomb segments in the second row, the bonded surfaces respectively of the honeycomb segments 2, which bonded surfaces face the bonded line 10, are arranged in alternations of the adhesive agent-unapplied surface 22, the adhesive agent-applied surface 21, the adhesive agent-unapplied surface 22, and the adhesive agent-applied surface 21 in order from left to right. By the arrangements, no adhesive agent-applied surfaces 21 are arranged side by side consecutively in the clusters of honeycomb segments along the uppermost bonded line 10. No adhesive agent-unapplied surface 22, either.

In the same manner, in a cluster of honeycomb segments in the first column which are vertically stacked one on top of another on the left side of the most left bonded line 10 in the vertical direction in FIG. 4, the bonded surfaces respectively of the honeycomb segments 2, which bonded surfaces face the bonded line 10, are arranged in alternations of the adhesive agent-applied surface 21, the adhesive agent-unapplied surface 22, the adhesive agent-applied surface 21 and the adhesive agent-unapplied surface 22 in order from top to bottom. In a cluster of honeycomb segments in the second column, the bonded surfaces respectively of the honeycomb segments 2, which bonded surfaces face the bonded line 10, are arranged in alternations of the adhesive agent-unapplied surface 22, the adhesive agent-applied surface 21, the adhesive agent-unapplied surface 22, and the adhesive agent-applied surface 21 in order from top to bottom. By the arrangements, no adhesive agent-applied surfaces 21 are vertically stacked one on top of another consecutively in the clusters of honeycomb segments along the uppermost bonded line 10, either. No adhesive agent-unapplied surface 22, either.

Similarly, the adhesive agent-applied surfaces 21 and the adhesive agent-unapplied surfaces 22 are arrayed alternately along the bonded lines 10 running in the horizontal and vertical directions. If the adhesive agent-applied surfaces 21 and the adhesive agent-unapplied surfaces 22 are arrayed alternately along the bonded lines 10 in this manner, neither a surface with the adhesive agent continuously applied thereto nor a surface with no adhesive agent continuously applied thereto occurs on the two sides of any of the bonded lines 10. Accordingly, moisture moving from the adhesive agent 9 on one side of any of the bonded lines 10 is equal to moisture moving from the adhesive agent 9 on the other side of the bonded line 10. This makes the strength on one side of the bonded line 10 equal to the strength on the other side of the bonded line 10. This can prevent a crack from occurring. Hence, this makes it possible to satisfactorily inhibit a crack from developing into the honeycomb structure which is obtained by bonding the honeycomb segments.

With regard to this embodiment, in the case where any two of the honeycomb segments are going to be bonded with each other, the adhesive agent-applied surface 21 of one honeycomb segment 2 and the adhesive agent-unapplied surface 22 of the other honeycomb segment 2 are fitted to each other. The two honeycomb segments 2 are bonded with each other while adhesive agent-applied surface 21 and the adhesive agent-unapplied surface 22 respectively of the honeycomb segments 2 are being fitted to each other. In FIG. 4, for example, the adhesive agent-applied surface 21 of the most left honeycomb segment 2 in the uppermost row and the adhesive agent-unapplied surface 22 of the honeycomb segment 2 abutting on the most left honeycomb segment 2 on the right side are fitted, face-to-face, to each other.

If the adhesive agent-applied surface 21 of one of any two abutting honeycomb segments 2 and the adhesive agent-unapplied surface 22 of the other honeycomb segment 2 are fitted to each other in this manner, the adhesive agent 9 between each two clusters of honeycomb segments, which are arrayed side by side in rows, or which are stacked one on top of another columns, can be even in thickness. Accordingly, the honeycomb structure can be even as a whole. In addition, this makes it possible to alternately array the adhesive agent-applied surfaces 21 and the adhesive agent-unapplied surfaces 22 with ease.

Hereinafter, concrete descriptions will be provided for Examples 1 to 3 respectively representing three different ways how the honeycomb segments are bonded.

BONDING EXAMPLE 1

FIGS. 6 to 11F respectively show patterns in which a predetermined number of honeycomb segments 2a shown in FIG. 5A, a predetermined number of honeycomb segments 2b shown in FIG. 5B and the adhesive agent 9 are arrayed in the direction which cross-sections the honeycomb structure. With regard to each of the honeycomb segments 2a, the adhesive agent is applied to a pair of side surfaces opposite to each other, and the cross section is square. With regard to each of the honeycomb segments 2b, the adhesive agent is applied to only one side surface, and the cross section is square. In addition, the honeycomb segments 2a and the honeycomb segments 2b are arrayed in a way that the adhesive agent-applied surfaces 21 and the adhesive agent-unapplied surfaces 22 are arranged alternately along the bonded lines 10 each joining the bonded surfaces respectively of the honeycomb segments 2.

Figure 9A:
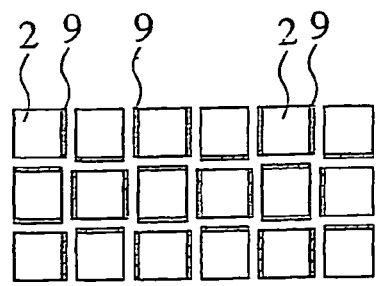
FIGS. 9A to 9D respectively show patterns in which the honeycomb segments 2a shown in FIG. 5A and the honeycomb segments 2b shown in FIG. 5B are arranged in 3 rows×6 columns, 4 rows×6 columns, 5 rows×6 columns, and 6 rows×6 columns in the direction which cross-sections the honeycomb structure.
Figure 9B:
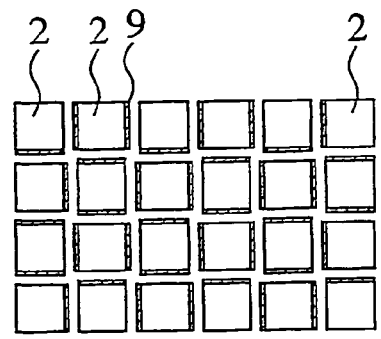
Figure 9C:
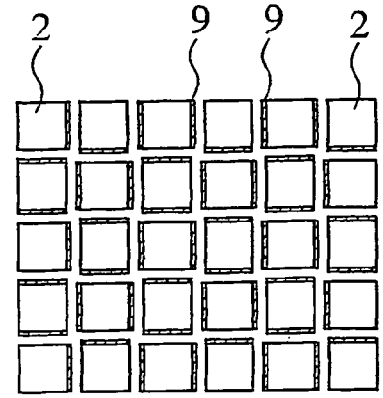
Figure 9D:
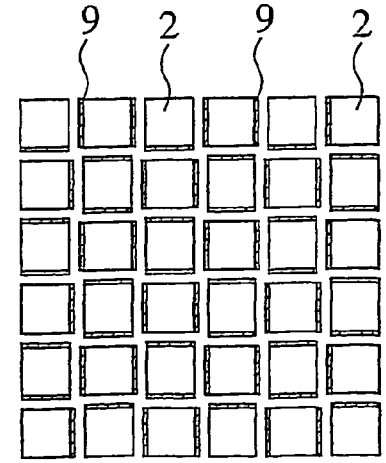
Figure 10A:
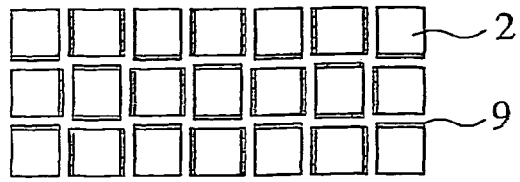
FIGS. 10A to 10E respectively show patterns in which the honeycomb segments 2a shown in FIG. 5A and the honeycomb segments 2b shown in FIG. 5B are arranged in 3 rows×7 columns, 4 rows×7 columns, 5 rows×7 columns, 6 rows×7 columns and 7 rows×7 columns in the direction which cross-sections the honeycomb structure.
Figure 10B:
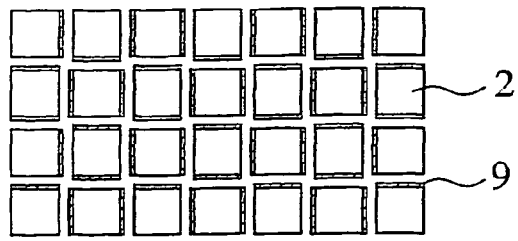
Figure 10C:
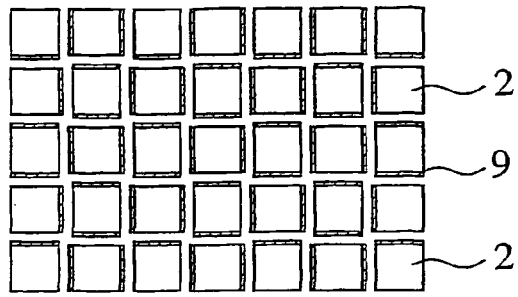
Figure 10D:
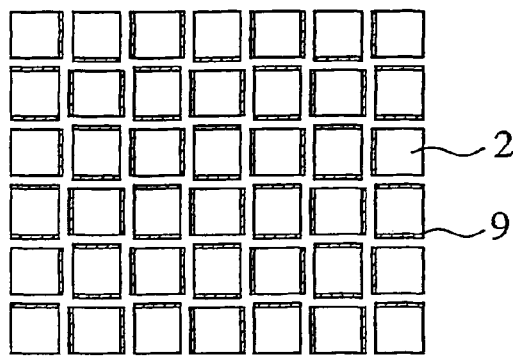
Figure 10E:
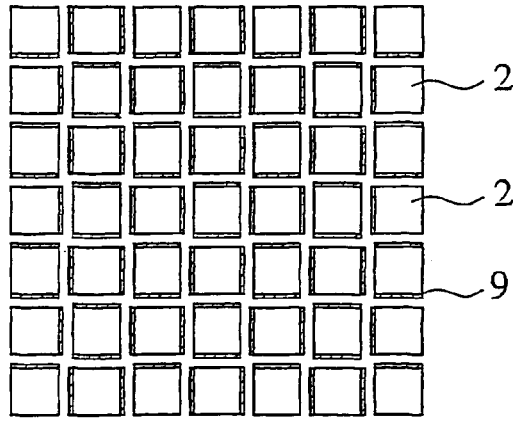
Figure 11A:
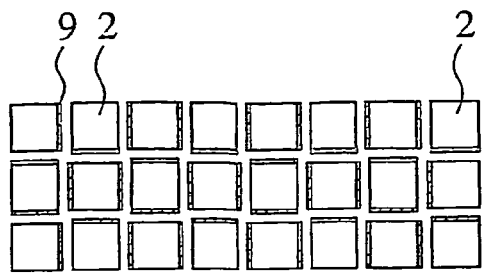
FIGS. 11A to 11F respectively show patterns in which the honeycomb segments 2a shown in FIG. 5A and the honeycomb segments 2b shown in FIG. 5B are arranged in 3 rows×8 columns, 4 rows×8 columns, 5 rows×8 columns, 6 rows×8 columns, 7 rows×8 columns and 8 rows×8 columns in the direction which cross-sections the honeycomb structure.
Figure 11B:
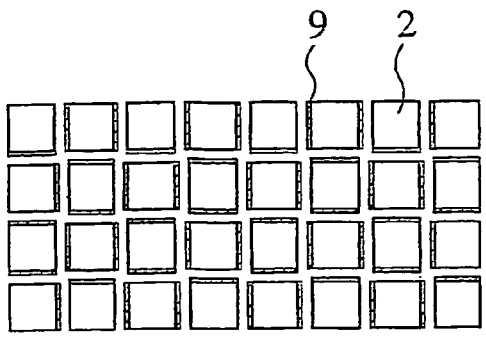
Figure 11C:
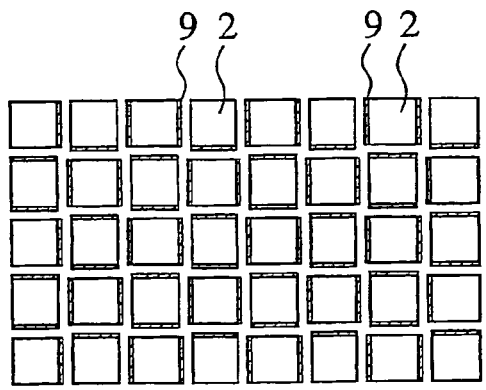
Figure 11D:
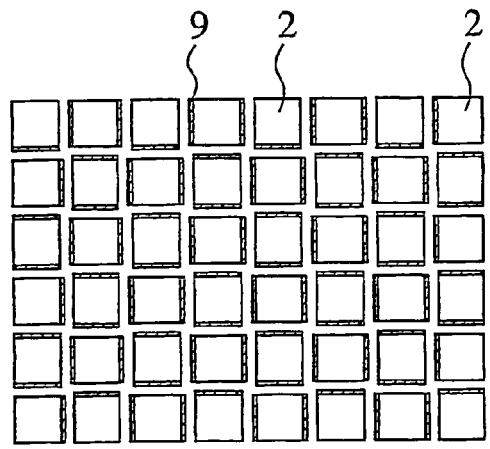
Figure 11E:
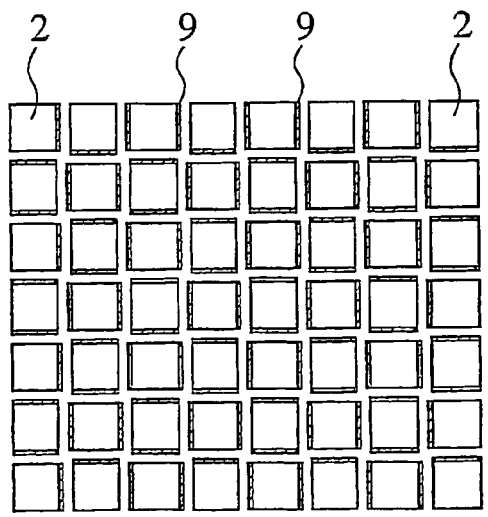
Figure 11F:
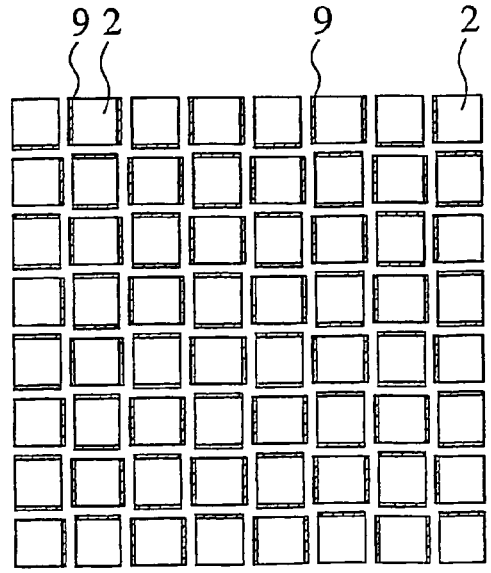

FIG. 6 shows a pattern in which the honeycomb segments are arrayed in 3 rows×3 columns. FIG. 7A shows a pattern in which the honeycomb segments are arrayed in 3 rows×4 columns. FIG. 7B shows a pattern in which the honeycomb segments are arrayed in 4 rows×4 columns. FIG. 8A shows a pattern in which the honeycomb segments are arrayed in 3 rows×5 columns. FIG. 8B shows a pattern in which the honeycomb segments are arrayed in 4 rows×5 columns. FIG. 8C shows a pattern in which the honeycomb segments are arrayed in 5 rows×5 columns. FIG. 9A shows a pattern in which the honeycomb segments are arrayed in 3 rows×6 columns. FIG. 9B shows a pattern in which the honeycomb segments are arrayed in 4 rows×6 columns. FIG. 9C shows a pattern in which the honeycomb segments are arrayed in 5 rows×6 columns. FIG. 9D shows a pattern in which the honeycomb segments are arrayed in 6 rows×6 columns. In addition, FIG. 10A shows a pattern in which the honeycomb segments are arrayed in 3 rows×7 columns. FIG. 10B shows a pattern in which the honeycomb segments are arrayed in 4 rows ×7 columns. FIG. 10C shows a pattern in which the honeycomb segments are arrayed in 5 rows×7 columns. FIG. 10D shows a pattern in which the honeycomb segments are arrayed in 6 rows×7 columns. FIG. 10E shows a pattern in which the honeycomb segments are arrayed in 7 rows×7 columns. FIG. 11A shows a pattern in which the honeycomb segments are arrayed in 3 rows×8 columns. FIG. 11B shows a pattern in which the honeycomb segments are arrayed in 4 rows×8 columns. FIG. 11C shows a pattern in which the honeycomb segments are arrayed in 5 rows×8 columns. FIG. 11D shows a pattern in which the honeycomb segments are arrayed in 6 rows×8 columns. FIG. 11E shows a pattern in which the honeycomb segments are arrayed in 7 rows×8 columns. FIG. 11F shows a pattern in which the honeycomb segments are arrayed in 8 rows×8 columns.

BONDING EXAMPLE 2

Figure 12A:
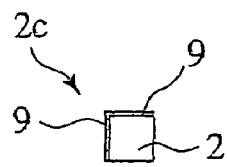
FIGS. 12A, 12B and 12C are cross-sectional views respectively of honeycomb segments 2b, 2c and 2d which are used for bonding of honeycomb structures shown in FIGS. 13 to 18F, the adhesive agent being applied to at least one side surfaces of the honeycomb segment 2b and 2c, the adhesive agent being applied to no side surface of the honeycomb segment 2d.
Figure 12B:
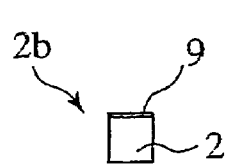
Figure 12C:
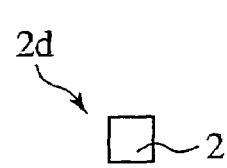
Figure 13:
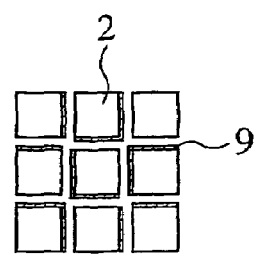
FIGS. 13 to 15C respectively show examples of patterns in which the honeycomb segments 2c shown in FIG. 12A, the honeycomb segments 2b shown in FIG. 12B and the honeycomb segments 2d shown in FIG. 12C are arranged in 3 rows×3 columns, 3 rows×4 columns, 4 rows×4 columns, 3 rows×5 columns, 4 rows×5 columns and 5 rows×5 columns in the direction which cross-sections the honeycomb structure.
Figure 14A:
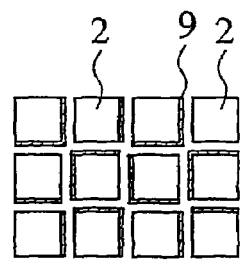
Figure 14B:
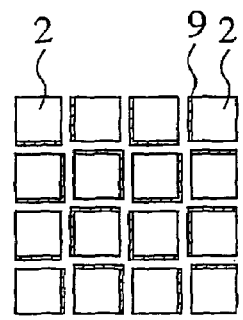
Figure 15A:
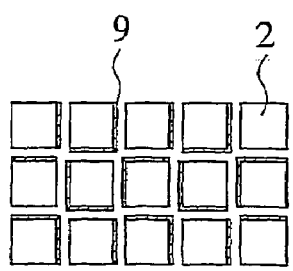
Figure 15B:
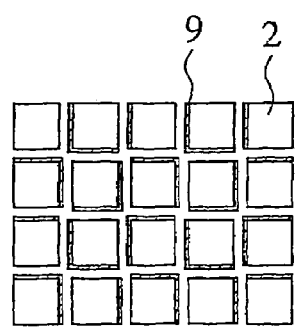
Figure 15C:
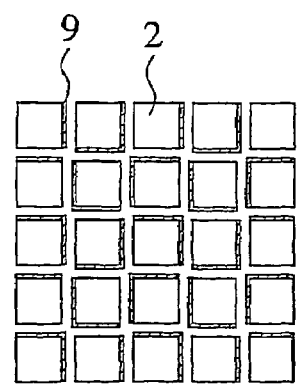
Figure 16A:
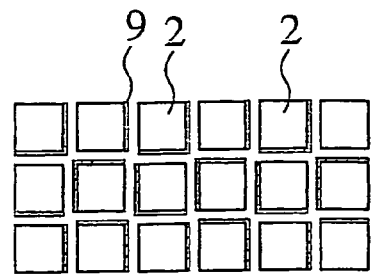
FIGS. 16A to 16D respectively show patterns in which the honeycomb segments 2c shown in FIG. 12A, the honeycomb segments 2b shown in FIG. 12B and the honeycomb segments 2d shown in FIG. 12C are arranged in 3 rows×6 columns, 4 rows×6 columns, 5 rows×6 columns, and 6 rows×6 columns in the direction which cross-sections the honeycomb structure.
Figure 16B:
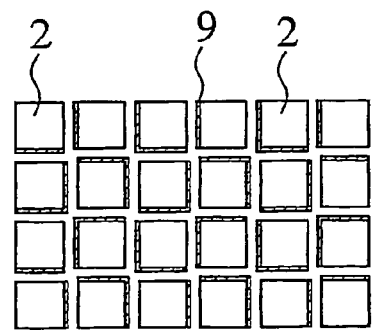
Figure 16C:
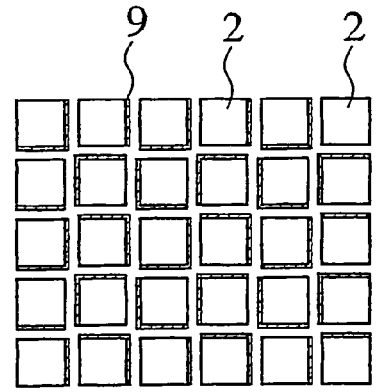
Figure 16D:
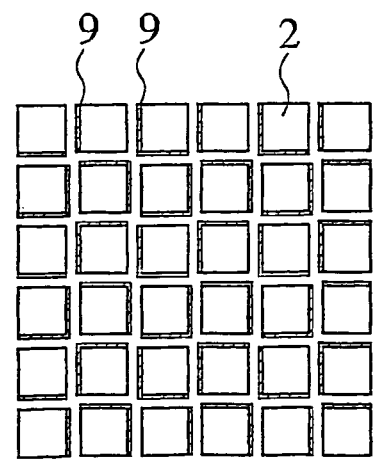
Figure 17A:
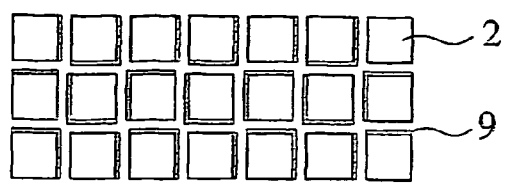
FIGS. 17A to 17E respectively show patterns in which the honeycomb segments 2c shown in FIG. 12A, the honeycomb segments 2b shown in FIG. 12B and the honeycomb segments 2d shown in FIG. 12C are arranged in 3 rows×7 columns, 4 rows×7 columns, 5 rows×7 columns, 6 rows×7 columns and 7 rows×7 columns in the direction which cross-sections the honeycomb structure.
Figure 17B:
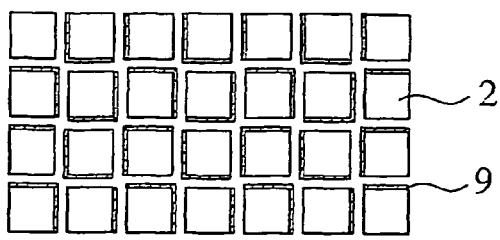
Figure 17C:
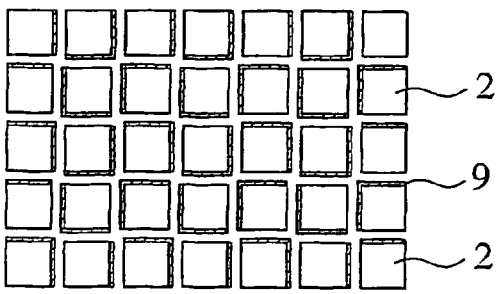
Figure 17D:
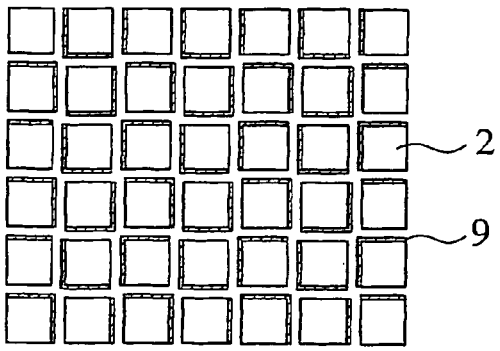
Figure 17E:
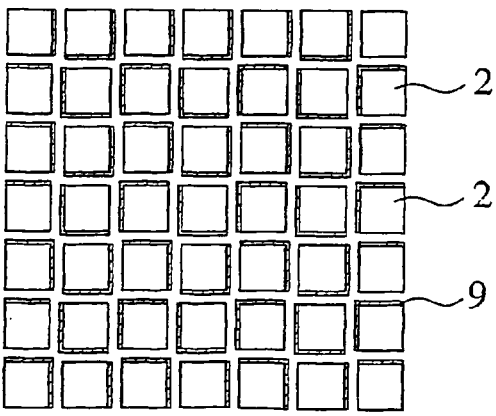
Figure 18A:
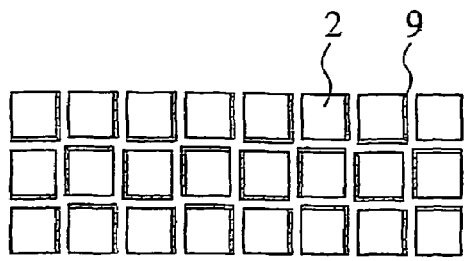
FIGS. 18A to 18F respectively show patterns in which the honeycomb segments 2c shown in FIG. 12A, the honeycomb segments 2b shown in FIG. 12B and the honeycomb segments 2d shown in FIG. 12C are arranged in 3 rows×8 columns, 4 rows×8 columns, 5 rows×8 columns, 6 rows×8 columns, 7 rows×8 columns and 8 rows×8 columns in the direction which cross-sections the honeycomb structure.
Figure 18B:
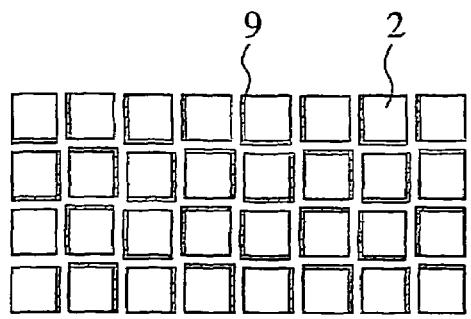
Figure 18C:
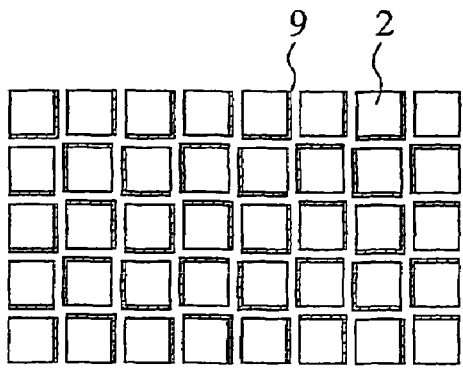
Figure 18D:
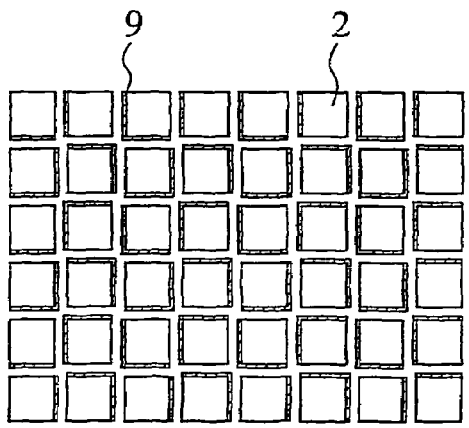
Figure 18E:
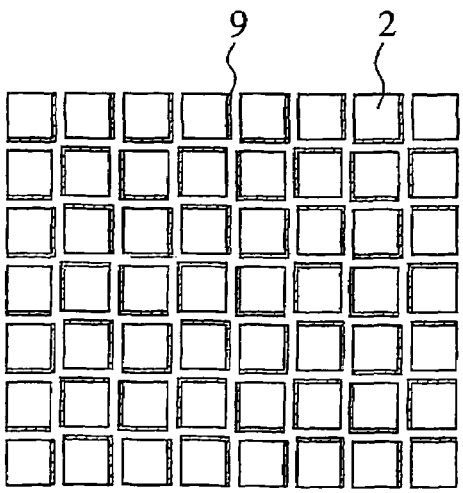
Figure 18F:
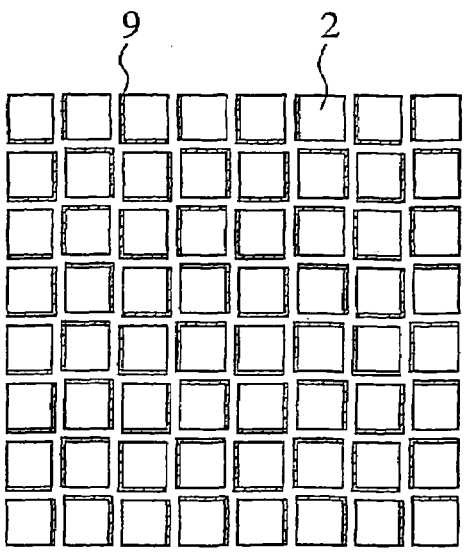
Figure 23A:
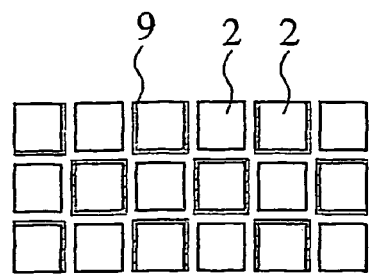
FIGS. 23A to 23D respectively show patterns in which the honeycomb segments 2e shown in FIG. 19A, the honeycomb segments 2f shown in FIG. 19B, the honeycomb segments 2c shown in FIG. 19C and the honeycomb segments 2d shown in FIG. 19D are arranged in 3 rows×6 columns, 4 rows×6 columns, 5 rows×6 columns, and 6 rows×6 columns in the direction which cross-sections the honeycomb structure.
Figure 23B:
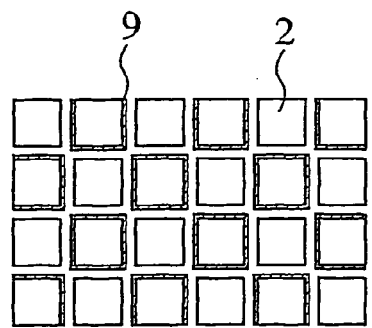
Figure 23C:
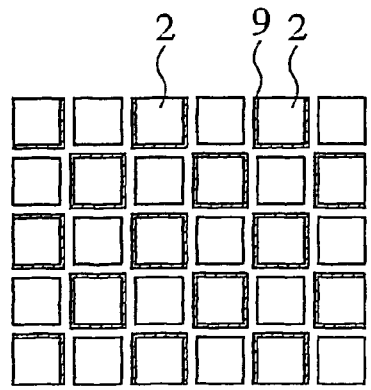
Figure 23D:
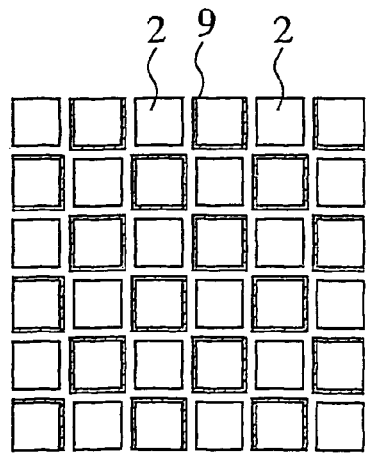
Figure 24A:
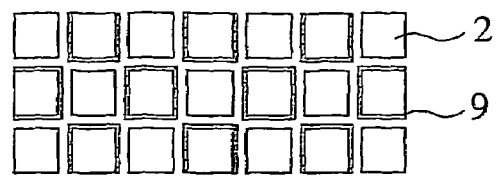
FIGS. 24A to 24E respectively show patterns in which the honeycomb segments 2e shown in FIG. 19A, the honeycomb segments 2f shown in FIG. 19B, the honeycomb segments 2c shown in FIG. 19C and the honeycomb segments 2d shown in FIG. 19D are arranged in 3 rows×7 columns, 4 rows×7 columns, 5 rows×7 columns, 6 rows×7 columns, and 7 rows×7 columns in the direction which cross-sections the honeycomb structure
Figure 24B:
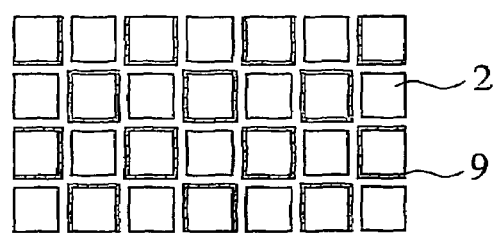
Figure 24C:
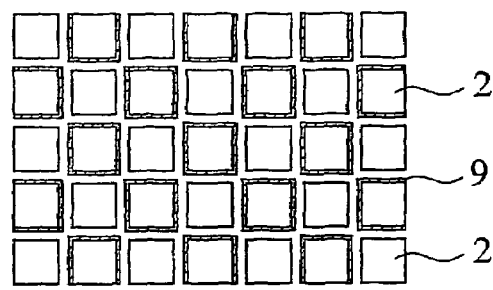
Figure 24D:
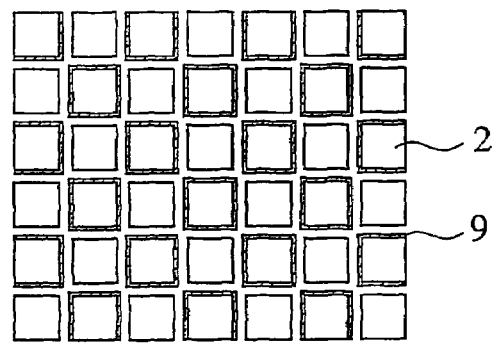
Figure 24E:
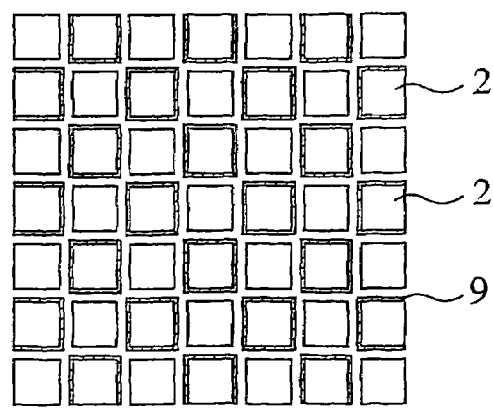
Figure 25A:
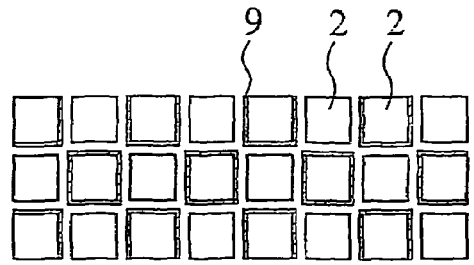
FIGS. 25A to 25F show patterns in which the honeycomb segments 2e shown in FIG. 19A, the honeycomb segments 2f shown in FIG. 19B, the honeycomb segments 2c shown in FIG. 19C and the honeycomb segments 2d shown in FIG. 19D are arranged in 3 rows×8 columns, 4 rows×8 columns, 5 rows×8 columns, 6 rows×8 columns, 7 rows×8 columns, and 8 rows×8 columns in the direction which cross-sections the honeycomb structure.
Figure 25B:
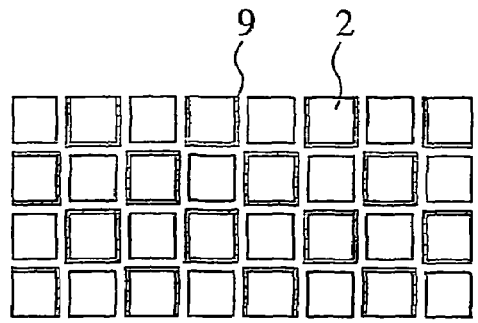
Figure 25C:
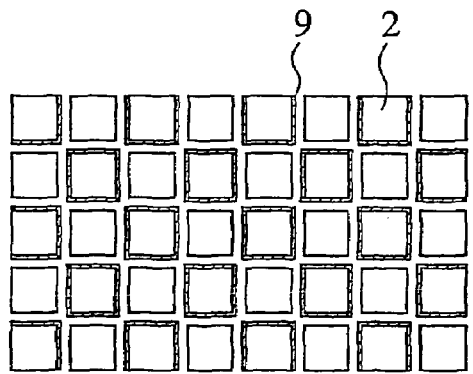
Figure 25D:
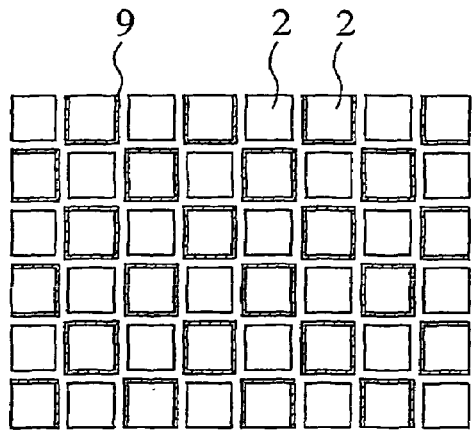
Figure 25E:
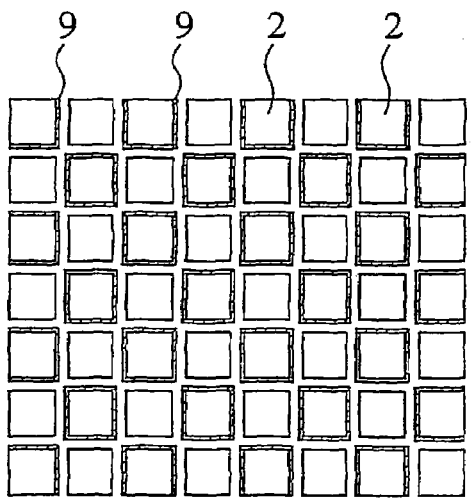
Figure 25F:
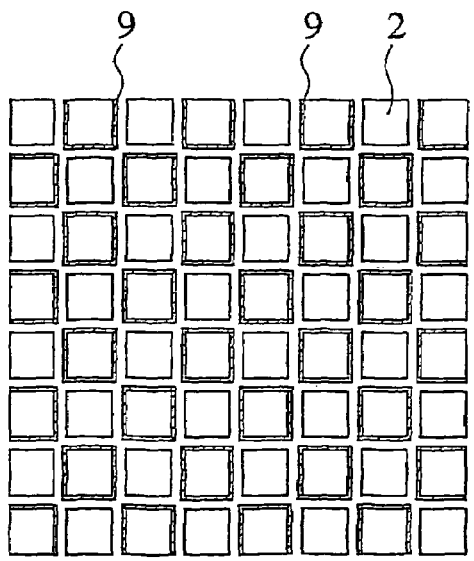

FIGS. 13 to 18F respectively show patterns in which a predetermined number of honeycomb segments 2c shown in FIG. 12A, a predetermined number of honeycomb segments 2b shown in FIG. 12B, a predetermined number of honeycomb segments 2d shown in FIG. 12C and the adhesive agent 9 are arrayed in the cross-section of the honeycomb structure. With regard to each of the honeycomb segments 2c, the adhesive agent 9 is applied to two side surfaces abutting on each other, and the cross section is square. With regard to each of the honeycomb segments 2b, the adhesive agent 9 is applied to only one side surface, and the cross section is square. With regard to each of the honeycomb segments 2d, the adhesive agent 9 is applied to no side surface. In addition, the honeycomb segments 2c, 2b and 2d are arrayed in a way that the adhesive agent-applied surfaces 21 and the adhesive agent-unapplied surfaces 22 are arranged alternately along the bonded lines 10 each joining the bonded surfaces respectively of the honeycomb segments 2 (see FIG. 4).

The numbers of rows and columns in which the honeycomb segments are arrayed in FIGS. 13 to 18F corresponds to the numbers of rows and columns in which the honeycomb segments are arrayed in FIGS. 6 to 11F.

BONDING EXAMPLE 3

FIGS. 20 to 25F respectively show patterns in which a predetermined number of each of four types of honeycomb segments 2 and the adhesive agent 9 are arrayed in the cross-section of the honeycomb structure. The four types of honeycomb segments 2 are honeycomb segments 2e shown in 19A, honeycomb segments 2f shown in 19B, honeycomb segments 2c shown in 19C, and honeycomb segments 2d shown in 19D. The cross sections respectively of the honeycomb segments 2 are square. With regard to each of the honeycomb segments 2e, the adhesive agent 9 is applied to all of the four side surfaces. With regard to each of the honeycomb segments 2f, the adhesive agent 9 is applied to three side surfaces. With regard to each of the honeycomb segments 2c, the adhesive agent 9 is applied to two side surfaces abutting on each other. With regard to each of the honeycomb segments 2d, the adhesive agent 9 is applied to no side surface. In addition, the honeycomb segments 2c, 2e, 2f and 2d are arrayed in a way that the adhesive agent-applied surfaces 21 and the adhesive agent-unapplied surfaces 22 are arranged alternately along the bonded lines 10 each joining the bonded surfaces respectively of the honeycomb segments 2 (see FIG. 4).

The numbers of rows and columns in which the honeycomb segments are arrayed in FIGS. 20 to 25F correspond to the numbers of rows and columns in which the honeycomb segments are arrayed in FIGS. 6 to 11F.

The adhesive agent-applied surfaces 21 and the adhesive agent-unapplied surfaces 22 are arrayed alternately along the bonded lines 10 each joining the bonded surfaces respectively of the honeycomb segments 2 in the case of each of the array patterns shown in FIGS. 6 to 11F, the array patterns shown in FIGS. 13 to 18F, and the array patterns shown in FIGS. 20 to 25F (see FIG. 4). For this reason, neither a surface with the adhesive agent continuously applied thereto nor a surface with no adhesive agent continuously applied thereto occurs on the two sides of any of the bonded lines 10. This makes the strength of the honeycomb segments 2 on one side of any of the bonded lines 10 equal to the strength of the honeycomb segments 2 on the other side of the bonded line 10. Accordingly, this makes it possible to prevent a crack from occurring.

It should be noted that this embodiment can be applied to honeycomb segments each having a triangle, rectangular, hexagonal, or another polygonal cross section, although the application of this embodiment to the honeycomb segments each having the square cross section has been described.

As described above, in the case of the honeycomb structure according to the present invention, the adhesive agent-applied surfaces and the adhesive agent-unapplied surfaces are arrayed alternately along any of the bonded lines each joining the bonded surfaces respectively of the honeycomb segments. For this reason, neither a surface with the adhesive agent continuously applied thereto nor a surface with no adhesive agent continuously applied thereto occurs. This makes the strength of the honeycomb segments on one side of any of the bonded lines equal to the strength of the honeycomb segments on the other side of the bonded line. This makes it possible to prevent a crack from occurring. Accordingly, this makes it possible to satisfactorily inhibit a crack from developing into the honeycomb structure.

In addition, in the honeycomb structure according to the present invention, the thickness respectively of the bonded layers can be equal to one another, and thus an even honeycomb structure can be obtained. This is because the adhesive agent-applied surface of one honeycomb segment and the adhesive agent-unapplied surface of the abutting honeycomb segment are fitted to, and thereby are bonded with, each other. Furthermore, work for arraying the honeycomb segments in a way that no adhesive agent-applied surfaces are arranged side by side and in a way that no adhesive-agent-unapplied surfaces are arranged side by side can be easily carried out.

Moreover, in the case of the method of manufacturing the honeycomb structure according to the present invention, a state can be created, where neither a surface with the adhesive agent continuously applied thereto nor a surface with no adhesive agent continuously applied thereto occurs on the sides of any of the bonded lines. This makes it possible to bond the honeycomb segments in a state of no crack occurring.

The descriptions have been provided for the substrate platform and the method of manufacturing the substrate platform according to the present invention from the viewpoint of the embodiment. However, the present invention shall not be limited to what has been described for the embodiment and examples. It is obvious to those skilled in the art that various improvements and modifications can be made.

The invention claimed is:

1. A honeycomb structure comprising:
a honeycomb segment assembly to be obtained by bonding a plurality of honeycomb segments each having a polygonal cross section with an adhesive agent interposed between each two honeycomb segments, the plurality of honeycomb segments each having a plurality of channels which are partitioned from one another by porous partition walls, the plurality of channels penetrating through the honeycomb segment in a uniaxial direction,
wherein
each of the plurality of honeycomb segments includes adhesive agent-applied side surfaces to which the adhesive agent is applied, and adhesive agent-unapplied side surfaces to which the adhesive agent is not applied,
the adhesive agent-applied side surfaces and the adhesive agent-unapplied side surfaces face each other, in the honeycomb structure, each of the plurality of honeycomb segments is bonded by the adhesive agent interposed between the adhesive agent-applied side surfaces and the adhesive agent-unapplied side surfaces, the adhesive agent-applied side having a stronger segment surface than the adhesive-agent unapplied side, and the adhesive agent-applied surfaces and the adhesive agent-unapplied surfaces are arranged alternately along bonded surfaces consisting of the adhesive agent.

2. The honeycomb structure according to claim 1, wherein the plurality of honeycomb segments, includes first square cross-sectioned honeycomb segments, and second square cross-sectioned honeycomb segments,
 a pair of two side surfaces facing each other, among four side surfaces of each of the first honeycomb segments, is the adhesive agent-applied side surfaces, and
 one single side surface, among four side surfaces of each of the second honeycomb segments, is the adhesive agent-applied side surface.

3. The honeycomb structure according to claim 1, wherein the plurality of honeycomb segments, includes second square cross-sectioned honeycomb segments, and third square cross-sectioned honeycomb segments,
 one single side surface among four side surfaces of each of the second honeycomb segments, is the adhesive agent-applied side surface, and
 a pair of two side surfaces facing each other, among four side surfaces of each of the third honeycomb segments, is the adhesive agent-applied side surface.

4. The honeycomb structure according to claim 1, wherein the plurality of honeycomb segments includes third square cross-sectioned honeycomb segments, fourth square cross-sectioned honeycomb segments, and fifth square cross-sectioned honeycomb segments,
 two adjacent side surfaces, among four side surfaces of each of the third honeycomb segments, is the adhesive agent-applied side surfaces,
 all four surfaces of each of the fourth honeycomb segments are the adhesive agent-applied side surfaces,
 three side surfaces, among four side surfaces of each of the fifth honeycomb segments are the adhesive agent-applied side surfaces.

5. A method of manufacturing a honeycomb structure, comprising the steps of:
 A, fabricating a plurality of honeycomb segments each having a polygonal cross section, and a plurality of channels which are partitioned from one another by porous partition walls, the plurality of channels penetrating through the honeycomb segment in a uniaxial direction;
 B, applying an adhesive agent to the plurality of honeycomb segments; and
 C, bonding the plurality of the honeycomb segments by the adhesive agent,
 wherein in the step B, adhesive agent-applied side surfaces to which the adhesive agent is applied or adhesive agent-unapplied side surfaces to which the adhesive agent is not applied are formed on each of the plurality of honeycomb segments,
 wherein in the step C, the adhesive agent-applied side surfaces and the adhesive agent-unapplied surfaces are arranged so that the adhesive agent-applied side surface and the adhesive agent-unapplied side surfaces face each other,
 the adhesive agent-applied side surfaces and the adhesive agent-unapplied side surfaces are alternately arranged along bonded surfaces consisting of the adhesive agent, and the plurality of honeycomb segments are bonded by the adhesive agent interposed between the adhesive agent-applied side surfaces and the adhesive agent-unapplied side surfaces.

6. The method of manufacturing a honeycomb structure according to claim 5, wherein
 in the step B, the adhesive agent-applied side surfaces or the adhesive agent-unapplied side surfaces are formed on each exterior side of each of the plurality of honeycomb segments, each exterior side being on the exterior or interior of the honeycomb structure, and
 in the step C, each exterior side on the interior of the honeycomb structure having an adhesive bond with another exterior side.

7. The method of manufacturing a honeycomb structure according to claim 6, wherein
 in the step C, the plurality of honeycomb segments are pressed against one another from the outside, thus a tentative honeycomb segment assembly is fabricated; and
 the tentative honeycomb segment assembly is heated to solidify the adhesive agent, and the honeycomb segment assembly is fabricated.

8. The method of manufacturing a honeycomb structure according to claim 7, wherein
 in the step A, as the plurality of honeycomb segments, first square cross-sectioned honeycomb segments and second square cross-sectioned honeycomb segments are formed, and
 in the step B, the adhesive agent-applied side surfaces is formed on a pair of two side surfaces facing each other, among four side surfaces of each of the first honeycomb segment; and
 the adhesive agent-applied side surface is formed on one side surface, among four side surfaces of each of the second honeycomb segment.

9. The method of manufacturing a honeycomb structure according to claim 7, wherein
 in the step A, as the plurality of honeycomb segments, second square cross-sectioned honeycomb segments and third square cross-sectioned honeycomb segments are formed, and
 in the step B, the adhesive agent-applied side surfaces are formed on one single side surface, among four side surfaces of each of the second honeycomb segment; and
 the adhesive agent-applied surfaces are formed on two adjacent side surfaces, among four side surfaces of each of the third honeycomb segment.

10. The method of manufacturing a honeycomb structure according to claim 7, wherein
 in the step A, as the plurality of the honeycomb segments, third square cross-sectioned honeycomb segments, fourth square cross-sectioned honeycomb segments, and fifth square cross-sectioned honeycomb segments are formed, and
 in the step B, the adhesive agent-applied side surfaces are formed on two adjacent side surfaces among four side surfaces of each of the third honeycomb segments;
 the adhesive agent-applied side surfaces are formed on all four side surfaces of each of the fourth honeycomb segments; and
 the adhesive agent-applied side surfaces are formed on three side surfaces, among four side surfaces of each of the fifth honeycomb segments.

11. The method of manufacturing a honeycomb structure according to claim 6, wherein in the step A, as the plurality of honeycomb segments, first square cross-sectioned honeycomb segments and second square cross-sectioned honeycomb segments are formed, and in the step B, the adhesive agent-applied side surfaces is formed on a pair of two side surfaces facing each other, among four side surfaces of each of the first honeycomb segment; and the adhesive agent-applied side surface is formed on one side surface, among four side surfaces of each of the second honeycomb segment.

12. The method of manufacturing a honeycomb structure according to claim 6, wherein in the step A, as the plurality of honeycomb segments, second square cross-sectioned honeycomb segments and third square cross-sectioned honeycomb segments are formed, and in the step B, the adhesive agent-applied side surfaces are formed on one single side surface, among four side surfaces of each of the second honeycomb segment; and the adhesive agent-applied surfaces are formed on two adjacent side surfaces, among four side surfaces of each of the third honeycomb segment.

13. The method of manufacturing a honeycomb structure according to claim 6, wherein in the step A, as the plurality of the honeycomb segments, third square cross-sectioned honeycomb segments, fourth square cross-sectioned honeycomb segments, and fifth square cross-sectioned honeycomb segments are formed, and in the step B, the adhesive agent-applied side surfaces are formed on two adjacent side surfaces among four side surfaces of each of the third honeycomb segments;

the adhesive agent-applied side surfaces are formed on all four side surfaces of each of the fourth honeycomb segments; and the adhesive agent-applied side surfaces are formed on three side surfaces, among four side surfaces of each of the fifth honeycomb segments.

* * * * *